United States Patent
Lunsford et al.

(10) Patent No.: US 9,759,225 B2
(45) Date of Patent: Sep. 12, 2017

(54) MULTI-PIECE IMPELLER

(71) Applicant: Rolls-Royce Corporation, Indianapolis, IN (US)

(72) Inventors: Patrick L. Lunsford, Danville, IN (US); Samuel J. LaCombe, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 980 days.

(21) Appl. No.: 14/143,245

(22) Filed: Dec. 30, 2013

(65) Prior Publication Data

US 2015/0016999 A1    Jan. 15, 2015

Related U.S. Application Data

(60) Provisional application No. 61/774,943, filed on Mar. 8, 2013.

(51) Int. Cl.
| | |
|---|---|
| *F04D 29/28* | (2006.01) |
| *F01D 5/04* | (2006.01) |
| *F01D 5/06* | (2006.01) |
| *F04D 17/10* | (2006.01) |
| *F04D 29/08* | (2006.01) |
| *F04D 29/62* | (2006.01) |

(52) U.S. Cl.
CPC ............ *F04D 29/284* (2013.01); *F01D 5/04* (2013.01); *F01D 5/066* (2013.01); *F04D 17/10* (2013.01); *F04D 29/083* (2013.01); *F04D 29/624* (2013.01); *Y02T 50/673* (2013.01); *Y10T 29/49329* (2015.01)

(58) Field of Classification Search
CPC .... F04D 29/284; F04D 29/083; F04D 29/624; F04D 17/10; F01D 5/04; F01D 5/066; Y10T 29/49329
See application file for complete search history.

(56) References Cited

U.S. PATENT DOCUMENTS

| 2,482,462 A | 9/1949 | Browne |
| 3,572,967 A | 3/1971 | Schreter et al. |
| (Continued) | | |

FOREIGN PATENT DOCUMENTS

| EP | 408010 A1 | 1/1991 |
| EP | 518027 A1 | 7/1995 |
| (Continued) | | |

OTHER PUBLICATIONS

International Search Report for PCT International Application Serial No. PCT/US2013/078204, completed Dec. 30, 2013, (10 pages).

*Primary Examiner* — Craig Kim
*Assistant Examiner* — Juan G Flores
(74) *Attorney, Agent, or Firm* — Barnes & Thornburg, LLP

(57) ABSTRACT

An impeller includes a shell having a plurality of blades. The shell may also define a cavity. The impeller may further include a backplate that engages at least a portion of the shell. The backplate can include a post which can be coupled to the impeller through a fastener such as a threaded nut. The backplate can be thereafter clamped to the impeller shell. Seals can be provided in the impeller, such as in the backplate. The backplate and impeller shell can be piloted onto each other. In some forms splines can be used to secure the backplate to the impeller shell.

12 Claims, 4 Drawing Sheets

(56) References Cited

U.S. PATENT DOCUMENTS

| | | | |
|---|---|---|---|
| 4,152,092 A | | 5/1979 | Swearingen |
| 4,183,719 A | | 1/1980 | Bozung |
| 4,273,512 A | | 6/1981 | Weiler |
| 4,787,821 A | | 11/1988 | Cruse et al. |
| 5,269,665 A | * | 12/1993 | Sadler ................. A47L 5/14 123/198 E |
| 5,372,499 A | * | 12/1994 | Motomura .......... C22C 32/0026 416/241 R |
| 5,520,008 A | * | 5/1996 | Ophir ................... F04D 29/023 416/185 |
| 5,895,203 A | | 4/1999 | Klein |
| 6,935,840 B2 | | 8/2005 | Romani et al. |
| 2005/0056013 A1 | | 3/2005 | Furman et al. |
| 2007/0059179 A1 | | 3/2007 | Xu |
| 2007/0065276 A1 | * | 3/2007 | Muller ................... F01D 11/02 415/170.1 |

FOREIGN PATENT DOCUMENTS

| | | | | |
|---|---|---|---|---|
| FR | 1122205 A | * | 9/1956 | ............. F01D 5/046 |
| WO | 0140660 A2 | | 6/2001 | |

\* cited by examiner

MULTI-PIECE IMPELLER

CROSS REFERENCE TO RELATED APPLICATIONS

This application claims priority to and the benefit U.S. Provisional Patent Application No. 61/774,943, filed on Mar. 8, 2013, the disclosure of which is now expressly incorporated herein by reference.

TECHNICAL FIELD

The present application relates to gas turbine engine impellers, and more particularly, but not exclusively, relates to gas turbine engine multi-piece impellers.

BACKGROUND

Providing for the construction of gas turbine engine impellers remains an area of interest. Some existing systems have various shortcomings relative to certain applications. Accordingly, there remains a need for further contributions in this area of technology.

SUMMARY

One embodiment of the present application is directed to a unique impeller. Other embodiments include unique methods, systems, devices, and apparatus related to multi-piece impellers. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF REPRESENTATIVE EMBODIMENTS

Figure 1:
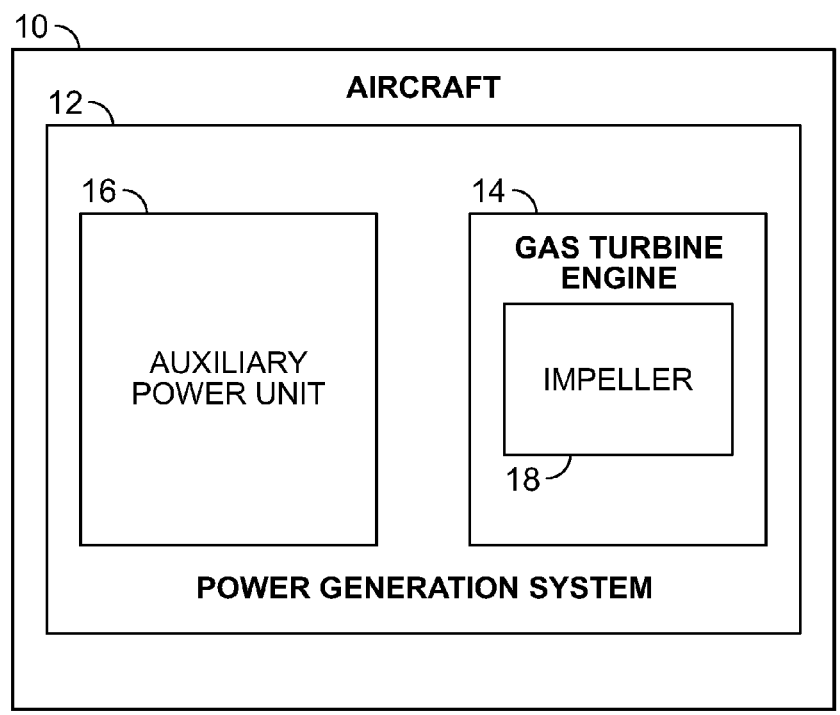
FIG. 1 is a block diagram of an aircraft.

For purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates are contemplated herein.

FIG. 1 is a schematic block diagram of an aircraft 10. The aircraft 10 may include, but is not limited to, helicopters, airplanes, unmanned aerospace vehicles, fixed wing vehicles, variable wing vehicles, rotary wing vehicles, tilt-wing vehicles, tilt-rotor vehicles, hover crafts, and others. Furthermore, the present application is contemplated for utilization in other applications that may not be coupled with an aircraft such as, for example, industrial applications, power generation, pumping sets, naval propulsion, and other applications known to one of ordinary skill in the art.

The aircraft 10 includes a power generation system 12 that provides power to the aircraft 10 such as, but not limited to, propulsive power. The power generation system 12 includes a gas turbine engine 14 and in the illustrated form also includes an auxiliary power unit 16, though it will be appreciated that not all embodiments of the power generation system 12 includes an auxiliary power unit 16. The auxiliary power unit 16 can take on a variety of forms and can be coupled with a generator that generates electrical power used to power various electrical systems on the aircraft 10.

Figure 2:
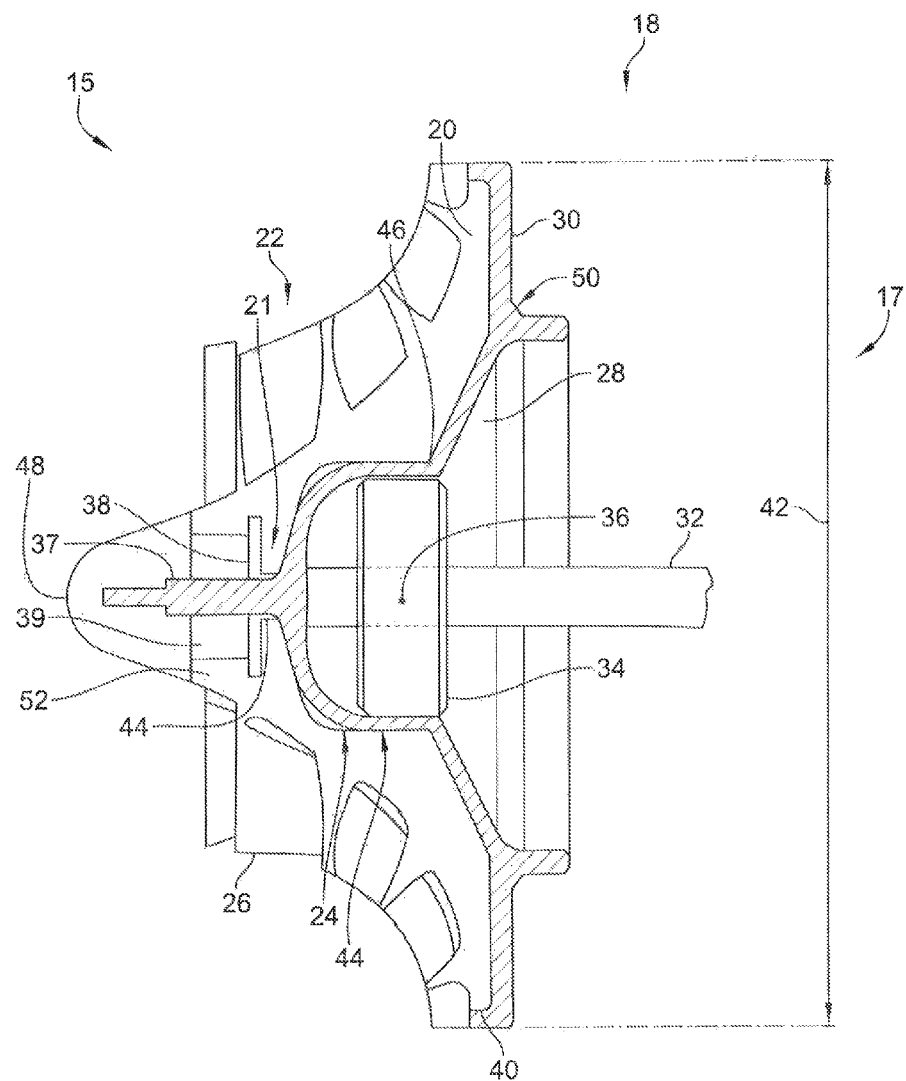
FIG. 2 is a cross-sectional view of one embodiment of an impeller.

Turning now to FIG. 2, either or both the gas turbine engine 14 and auxiliary power unit 16 can include an impeller 18. FIG. 2 depicts a cross-sectional view of one embodiment of the impeller 18. The impeller 18 may be a centrifugal flow compressor, however it is contemplated that the principles of the present application may be applied to other gas turbine engine impellers whether or not centrifugal flow compressors.

The impeller 18 includes a shell 20 having a first side 22 and a second side 24. The first side 22 includes one or more blades 26 extending therefrom and which are used to change a pressure of working fluid flowing through a turbomachinery component that includes the impeller 18. For ease of description and as will be appreciated, as will be used herein the blades 26 refer generally to aerodynamic shaped members that extend into the flow path and can any suitable member such as blades and inducers, etc. The shell 20 may be formed using any suitable process such as, but not limited to, casting, milling, machining, forging, or any combination thereof. Furthermore, the shell 20 can be made from a variety of materials, including titanium and assorted alloys thereof as one non-limiting example. One non-limiting embodiment of the second side 24 is shown in FIG. 2 as including a cavity 28.

The impeller 18 of the present application includes a backplate 30 that is used to cover, partially cover, or be inserted into the cavity 28 and which engages at least a portion of the second side 24 of the shell 20. The backplate 30 may be formed using any suitable process such as, but not limited to, casting, milling, machining, forging, or any combination thereof. Furthermore, the backplate 30 can be made from a variety of materials, including steel as one non-limiting example. Generally, the backplate 30 is one of the most highly stressed areas on an impeller. As will be appreciated given the description above, the shell 20 and the backplate 30 can be formed from different materials.

The gas turbine engine 14 may also include a shaft 32 that is attached to the backplate 30. In the illustrated embodiment, a bearing 34 is provided on the shaft 32 to support the shaft 32 as the impeller 18 rotates. The bearing 34 may be any suitable type of bearing including journal bearings, rolling element bearings, etc.

In the embodiment shown in FIG. 2, the backplate 30 extends substantially around a surface area of the cavity 28, which allows the bearing 34 to be located at least partially inside the cavity 28. In some embodiments the bearing 34 can be at approximately a center of gravity 36 of the impeller 18 such that the impeller 18 is non-cantilevered. A non-cantilevered impeller 18 can provide for the elimination of moment loads on the bearing 34. In addition, the bearing 34 can provide a more stable and rigid support for the impeller 18.

The backplate 30 can be secured to the shell 20 in one or more ways. As shown in the illustrated embodiment, the backplate 30 includes a post 37 that extends away from the shaft 32 and through a portion of the first side 22. The backplate 30 and impeller 18 can be clamped forward using a nut 39 and washer 38. The post 37 can include threaded features which receive the nut 39. The post 37 can extend through a passage formed in the impeller 18. The nut 39 and post 37 can be reverse threaded. In some embodiments one or more posts can be used to extend through one or more passages. The passage can take the form of a cylindrical hole formed through the impeller 18 from the first side 22 to the second side 24, but other shapes are also contemplated. The washer 38, if present, can bear against a load bearing structure formed in the impeller 18, for example a shelf that defines part/all of the passage through which the post 37 extends. In other embodiments that may not include a washer 38, the nut 39 can bear directly against the load bearing structure. Other techniques of securing the post 37/backplate 30 to the impeller 18 other than through a threaded interconnection are also contemplated herein.

The backplate 30 and/or impeller 18 can include pilot features 40 so that the backplate 30 can pilot onto the shell 20. In such cases the pilot features can also provide for a friction drive interconnection between the backplate 30 and impeller 18. Such a piloted feature can be located near or at an exducer diameter 42 as shown in the non-limiting illustrated embodiment. The pilot features can also serve to discourage forward deflection of the shell 20 near the exducer diameter 42 during operation of the impeller 18.

To ensure that the shell 20 and the backplate 30 properly rotate together, splines 44 can be provided in some additional and/or alternative embodiments on the shell 20 and the backplate 30 in one or more locations. The splines 44 may be used, for example, if a friction drive at the pilot or exducer diameter 42 is not sufficient to transmit drive torque. As one example of where the splines 44 may be located, the splines 44 on the shell 20 may be located near the area where the backplate 30 is secured or clamped forward, such as by a nut and washer 38. For example, the splines may be located in the passage of the bore through which the post 37 passes. A spline surface can be formed around the entirety of the passage and cooperate around the entirety of the post 37, but in some embodiments a spline surface need only extend around part of the entirety of the passage and post 37. Other shapes whether continuous, intermittent, symmetric, notched, etc., are also contemplated herein.

In some embodiments the impeller 18 may also include a ring 46 around the cavity 28. For example, the ring 46 may be a stiffening ring that prevents the cavity 28 from ballooning or deforming. In one embodiment, the ring 46 is formed integrally with the shell 20.

The impeller 18 may also include a nose 48 such as a spinner nose. In one embodiment, the nose 48 attaches to the impeller 18 by a reverse thread. For example, the post 37 of the backplate 30 may include threads and the nose 48 includes corresponding mating threads. In other embodiments the nose 48 can attach directly to the first side 22.

The impeller 18 may include one or more seals 50 on an outer portion of the backplate 30. For example, the backplate 30 may include a knife seal or a labyrinth seal to prevent air from flowing to and/or around other components in the gas turbine engine 14.

The impeller 18 may also include a balance stock portion 52 in the shell 20 in which material may be added or removed, e.g., by grinding or machining, so that the impeller 18 is balanced as the impeller 18 rotates.

Figure 3:
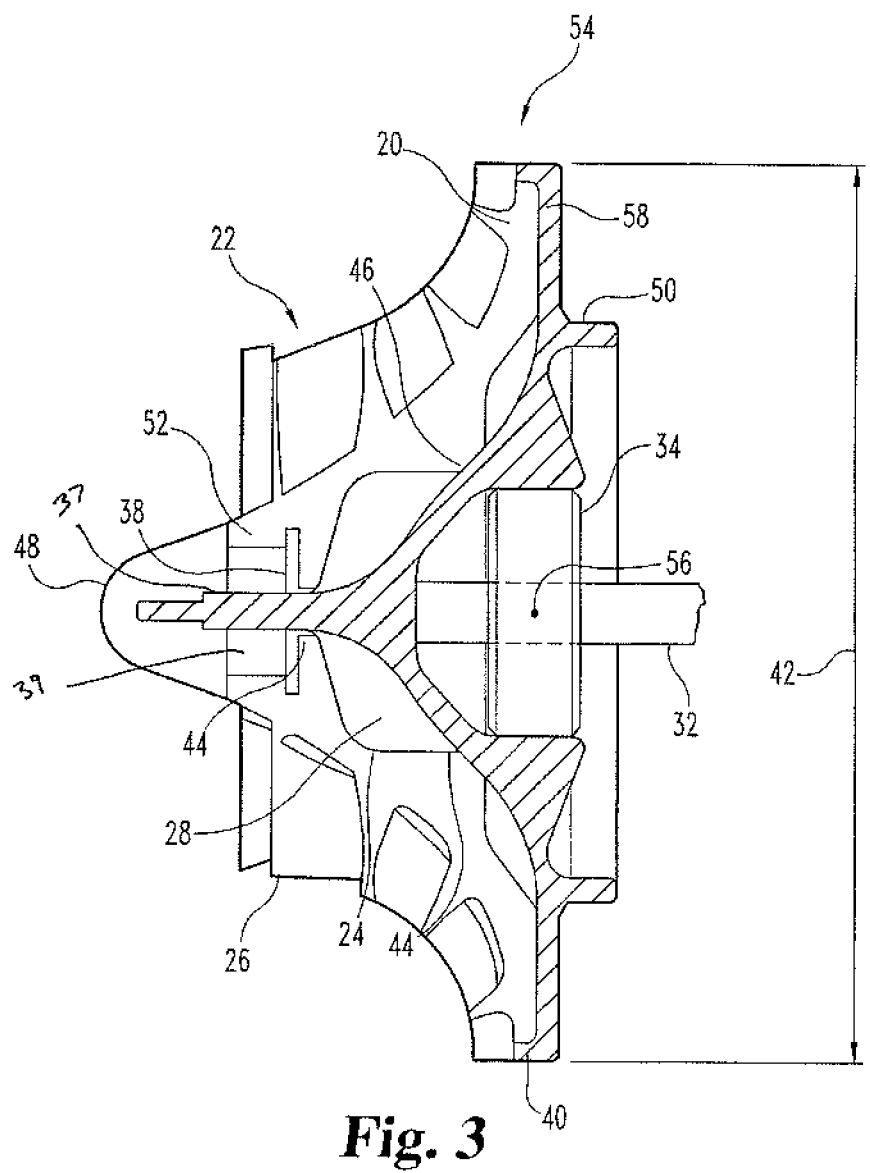
FIG. 3 is a cross-sectional view of another embodiment of an impeller.

FIG. 3 shows another embodiment of an impeller 54 in which the bearing 34 may be located further aft of the nose 48 because the center of gravity 56 of the impeller 54 is shifted in accordance with the weight distribution of the design of the backplate 58. The design of the backplate 58, shell 20, etc. depicted in FIG. 3 can include any of the variations discussed above with respect to any of its illustrated components, interconnections, etc. In FIG. 3, the backplate 58 does not extend substantially around a surface area of the cavity 28 thus forming a large area between the shell 20 and backplate 30. Thus, the center of gravity 56 of the impeller 54 is shifted according to this illustrated embodiment. It will, however, be appreciated that the bearing 34 can be located near the center of gravity thus minimizing the cantilever effect.

Figure 4:
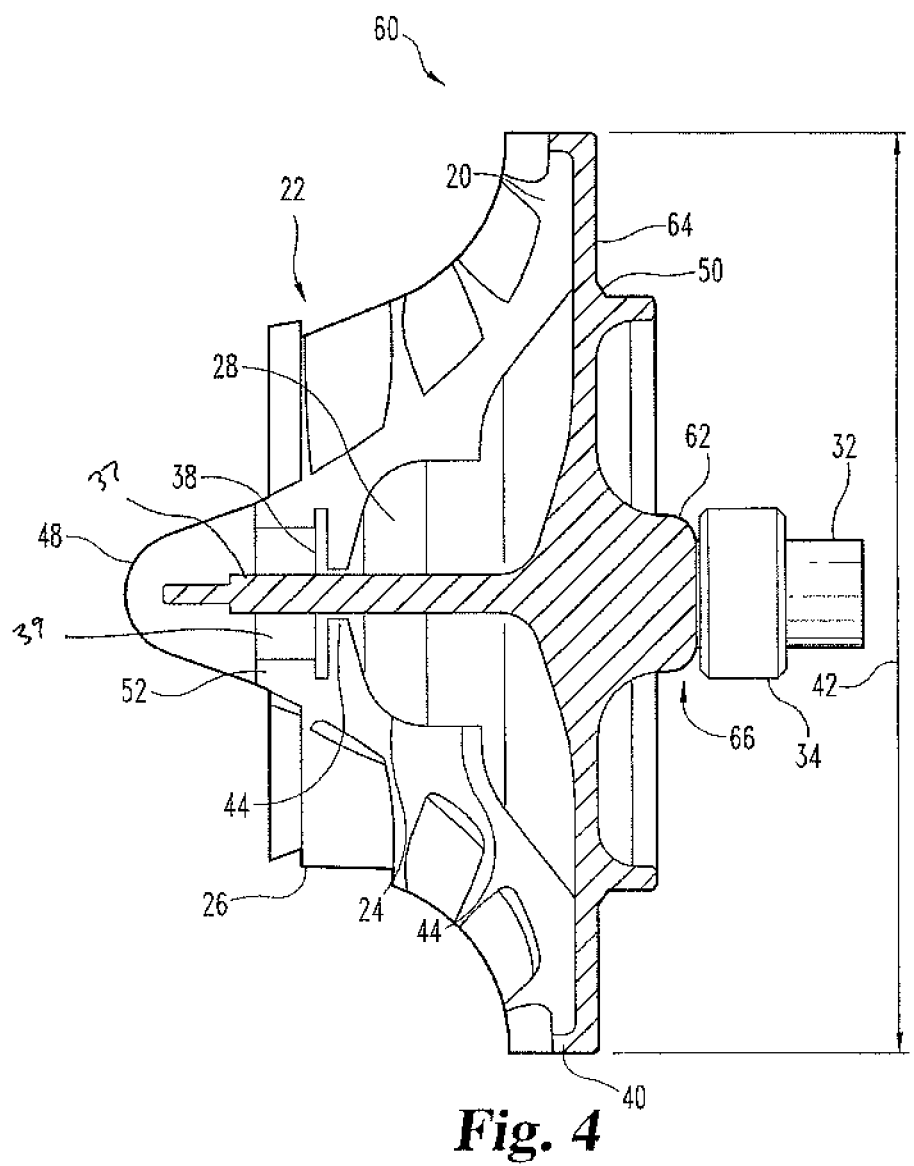
FIG. 4 is a cross-sectional view of yet another embodiment of an impeller.

FIG. 4 shows yet another non-limiting embodiment of an impeller 60 in which the bearing 34 is located outside of the cavity 28. The bearing 34 couples to the shaft 32 near an extension 62 of the backplate 64. The design of the backplate 64, shell 20, etc. depicted in FIG. 4 can include any of the variations discussed above with respect to any of its illustrated components, interconnections, etc. The backplate 64 and/or shaft 32 include the appropriate geometry 66 to connect with one or more other shafts (not shown) in the gas turbine engine 14.

For descriptive purposes, the post 37 may be referred to as any of a protrusion, center member, or finer; the shell 20 may be referred to as a front side component; and the backplate 30 may be referred to as a backside component. As shown in FIG. 2, the load bearing structure 21 formed in the impeller 18 may be referred to as a shoulder. In some embodiments, the shell 20 may include a first end 15 and a second end 17. In some embodiments, the first end 15 may be formed as a narrow end and the second end 17 may be formed as a large end.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
 a gas turbine engine turbomachinery impeller useful for changing a pressure of a working fluid that flows through the impeller during operation of a gas turbine engine, the impeller having:
 a bladed shell from which extends a plurality of centrifugal blades, the bladed shell having a first end and a second end, the first end having a smaller radius than the second end, the bladed shell having a shoulder that includes a load bearing surface;

a backside plate located with the second end and having a protrusion extending toward the first end of the bladed shell and past the load bearing surface such that the load bearing surface is interposed between an end of the protrusion and the backside plate; and a fastener used to secure the protrusion of the backside plate to the bladed shell in which the fastener engages the protrusion and bears against the load bearing surface, wherein the backside plate is a cover used to at least partially enclose a cavity on a backside of the bladed shell and a bearing is disposed within the cavity to rotatingly support the impeller for driven rotation by a shaft.

2. The apparatus of claim 1, wherein the shoulder is formed about an aperture and the protrusion is a threaded center member that extends through the aperture.

3. The apparatus of claim 2, which further includes a pilot feature formed in the bladed shell and a complementary pilot feature formed in the backside plate.

4. The apparatus of claim 1, wherein the bladed shell includes a stiffening ring disposed in the cavity formed on the backside of the bladed shell.

5. The apparatus of claim 4, wherein the impeller includes a seal on a backside of the impeller.

6. The apparatus of claim 1, which further includes a gas turbine engine having the impeller, and wherein the bearing is included to rotatingly support a shaft that turns with the impeller, the bearing located at a center of gravity of the impeller.

7. A method comprising:

orienting a centrifugal impeller front side component having a bladed surface relative to a centrifugal impeller backside component useful to be coupled with a shaft of a gas turbine engine, the centrifugal impeller backside component extending in radius to a radially outer portion of the centrifugal impeller front side component;

inserting a finger of the centrifugal impeller backside component though a passageway formed in the centrifugal impeller front side component, and engaging a splined surface of the finger with a complementary splined surface of a bore of the centrifugal impeller front side component;

moving a fastener into an engaged orientation with the finger of the centrifugal impeller backside component after the finger has emerged through the passageway formed in the centrifugal impeller front side component;

loading the fastener after the moving to urge the centrifugal impeller front side component into a loaded configuration with the centrifugal impeller backside component.

8. The method of claim 7, which further includes piloting the centrifugal impeller backside component on to the centrifugal impeller front side component.

9. The method of claim 7, wherein the loading the fastener results in a connection between a titanium centrifugal impeller front side component and a steel centrifilgal impeller backside component.

10. The method of claim 7, wherein the moving includes inserting the fastener toward a bore of the centrifugal impeller front side component; and wherein the loading includes tightening the fastener onto threads of the finger, wherein the fastener is a complementary threaded nut.

11. The apparatus of claim 1, wherein the backside plate includes a seal extending in a direction opposite that of the protrusion, and the bearing is arranged axially between the protrusion and the seal.

12. The apparatus of claim 11, wherein the backside plate includes pilot features extending in in a direction opposite that of the seal, and the bearing is arranged axially between the protrusion and the pilot features.

\* \* \* \* \*